US006974959B1

(12) United States Patent
Thoms

(10) Patent No.: US 6,974,959 B1
(45) Date of Patent: Dec. 13, 2005

(54) FLAT STORAGE ELEMENT FOR AN X-RAY IMAGE

(75) Inventor: Michael Thoms, Bietigheim-Bissingen (DE)

(73) Assignee: Durr Dental GmbH & Co. KG, Bietigheim-Bissingen (DE)

( * ) Notice: Subject to any disclaimer, the term of this patent is extended or adjusted under 35 U.S.C. 154(b) by 0 days.

(21) Appl. No.: 09/869,407

(22) PCT Filed: Nov. 29, 1999

(86) PCT No.: PCT/EP99/09250

§ 371 (c)(1),
(2), (4) Date: Jun. 22, 2001

(87) PCT Pub. No.: WO00/39805

PCT Pub. Date: Jul. 6, 2000

(30) Foreign Application Priority Data

Dec. 23, 1998 (DE) ................................ 198 59 880

(51) Int. Cl.[7] ......................... G03B 42/00; C09K 11/61
(52) U.S. Cl. ................. 250/484.4; 250/250; 250/484.2
(58) Field of Search .......................... 250/484.4, 484.3, 250/484.2, 486.1, 585, 586, 581

(56) References Cited

U.S. PATENT DOCUMENTS 4,297,584 A * 10/1981 Buchanan et al. ....... 250/483.1
4,374,749 A 2/1983 Cusano et al.
4,733,090 A * 3/1988 DeBoer et al. .......... 250/484.4
4,780,376 A * 10/1988 Nakamura ............... 250/484.4
4,835,396 A * 5/1989 Kitada et al. ............ 250/483.1
4,944,026 A * 7/1990 Arakawa et al. ......... 250/484.4
4,999,505 A 3/1991 Gasper et al.
5,023,461 A * 6/1991 Nakazawa et al. ....... 250/484.4
5,391,884 A * 2/1995 Sieber et al. ............ 250/484.4
5,693,254 A * 12/1997 Sieber et al. .......... 250/370.09

FOREIGN PATENT DOCUMENTS

| | | | | |
|---|---|---|---|---|
| DE | 2642478 | | 3/1978 | |
| DE | 8337403.5 | | 3/1986 | |
| DE | 9116631.4 | | 8/1993 | |
| EP | 290289 | A1 * | 11/1988 | ........... C09K 11/02 |
| EP | 0506585 | | 9/1992 | |
| FR | 2500467 | | 2/1982 | |

OTHER PUBLICATIONS

Seggern, I., *Photostimulierbare Speicherleuchtstoffe fur Rontgenstrahlung*, Phys. B1. 54, Nr. 6, p. 529-31 (1998).
Thoms, M., *Vom Speicherleuchtstoff zum Rontgendetektor*, Phys. B1. 48, Nr. 9, p. 719-23 (1992).

* cited by examiner

*Primary Examiner*—Albert Gagliardi
(74) *Attorney, Agent, or Firm*—Factor & Lake

(57) ABSTRACT

Storage film (10) serving to produce latent X-ray images in lieu of conventional X-ray film, containing storage particles (20) which are held together by a binding agent (22) and in which metastable electronic excited states can be produced. The refractive index of the binding agent (22) and the storage particles (20) are selected in such a way that they are equally high so that the storage layer (12) formed by the storage particles (20) and the binding agent (22) behave like an optically homogenous body.

54 Claims, 3 Drawing Sheets

Figure 1:
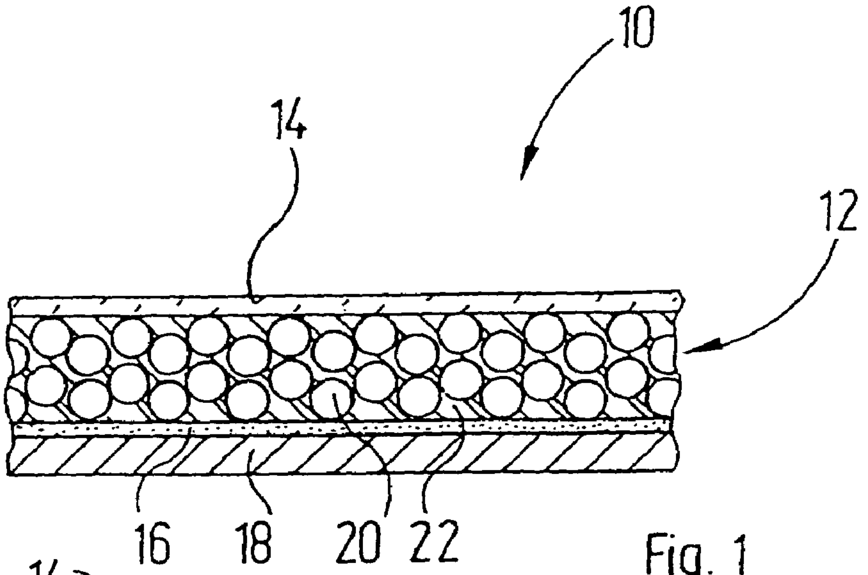

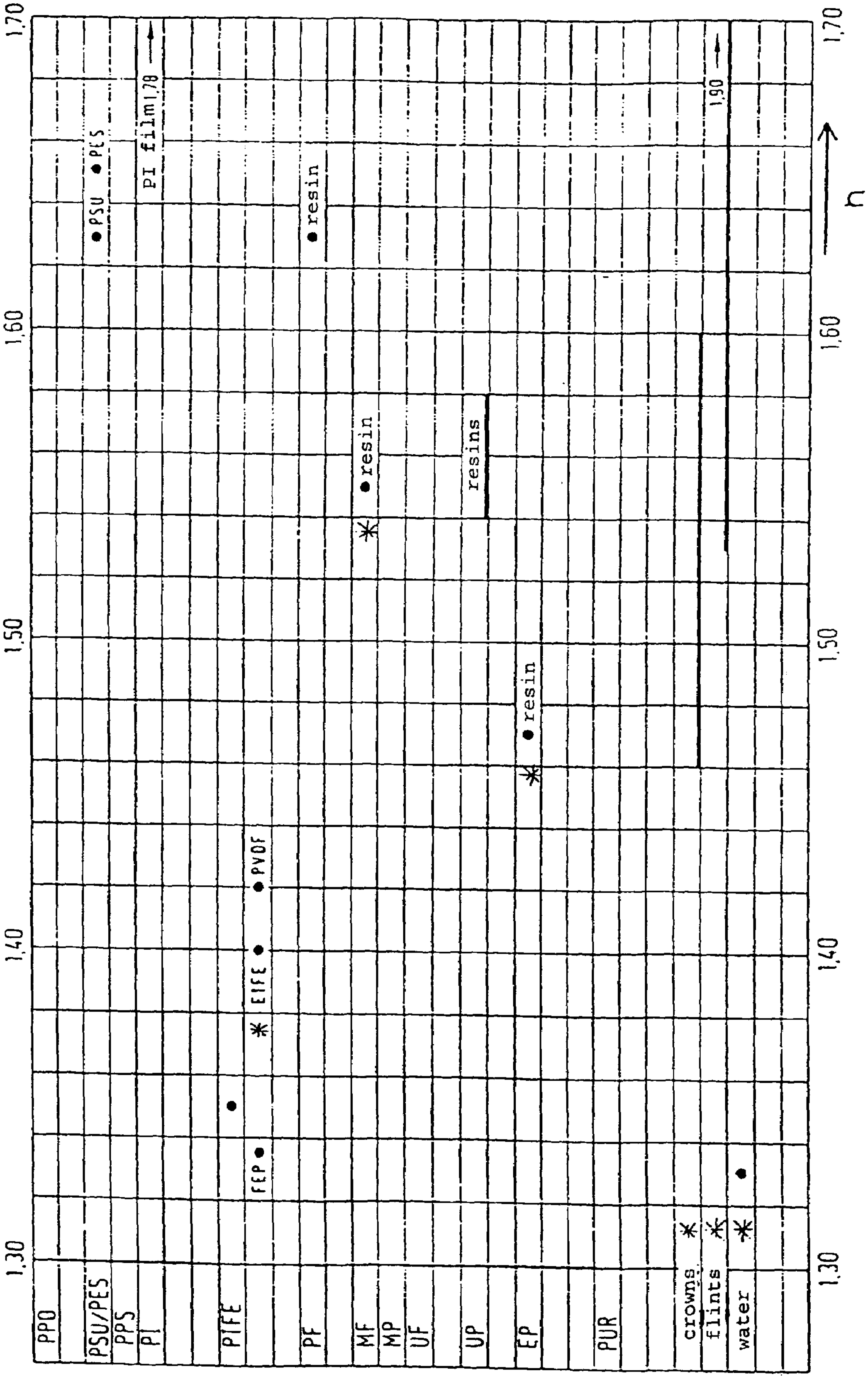
Fig. 4 (upper section)

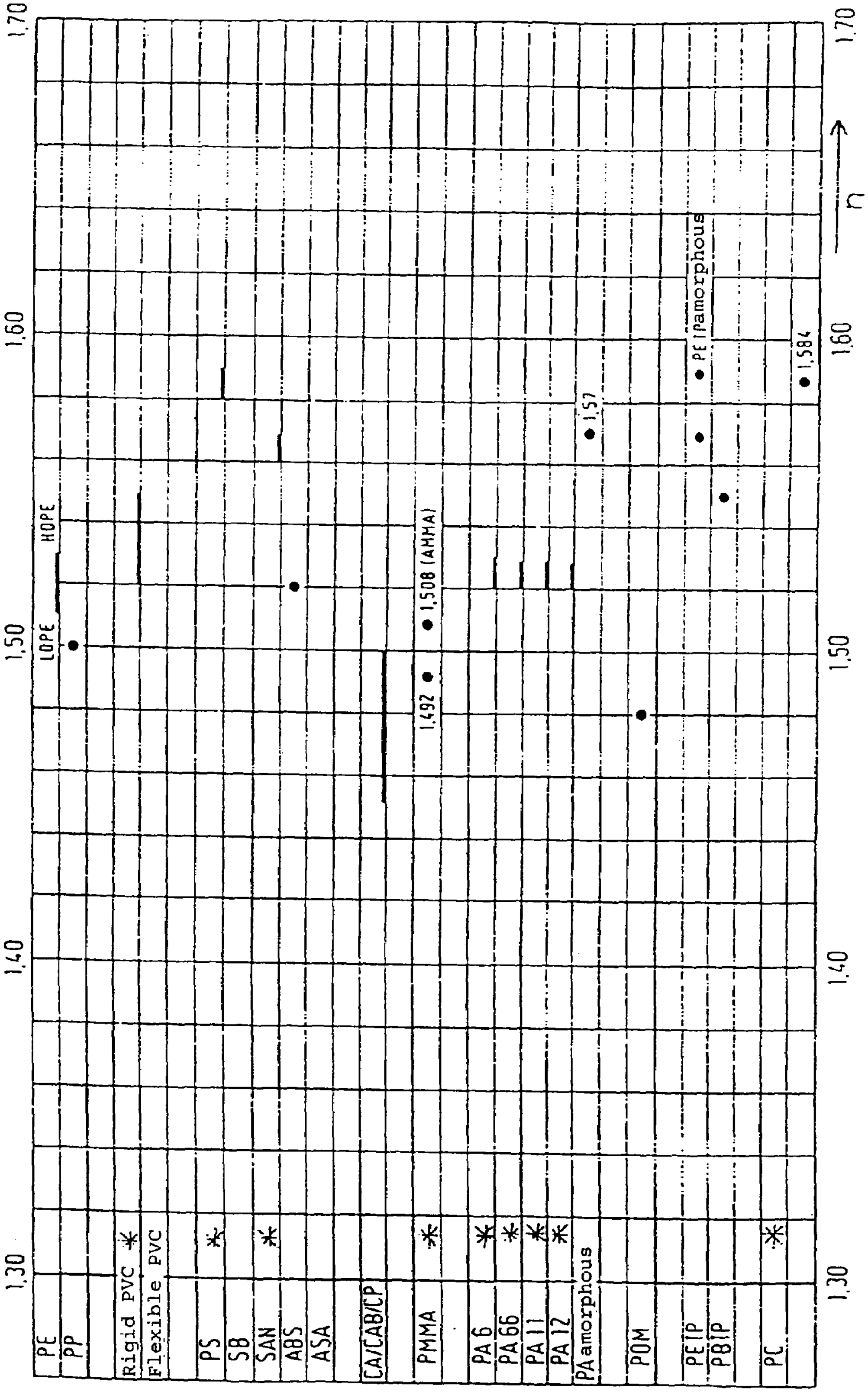
Fig. 4 (lower section)

FLAT STORAGE ELEMENT FOR AN X-RAY IMAGE

The invention relates to a flat storage element for an X-ray image.

Storage elements of this kind are obtainable commercially as so-called storage films.

With such storage films the storage layer formed by storage particles and a binding agent matrix is optically inhomogeneous, and there occurs as a result of said inhomogeneities a scattering of the activating light, which is used for reading out the latent image, and also a scattering of the measuring light read out. The resolution of the storage element is consequently influenced disadvantageously.

The above-mentioned scatter effects are the stronger the smaller the storage particles are. Small storage particles are conversely advantageous, however, with respect to high resolution of the storage element.

There is therefore to be created by the present invention a storage element which is optically homogeneous, so that no scattering of activating light and measuring light takes place in the storage layer.

This object is achieved according to the invention by a storage element for an X-ray image, with a large number of storage particles which may be placed by means of X-ray light in metastable excitation states that are convertible by irradiation with activating light into an unstable excitation state which is in turn decomposed with the radiation of fluorescent light, and with a transparent binding agent by means of which the storage particles are held together to form a storage layer, wherein the binding agent and the storage particles have substantially the same refractive index.

With the storage element according to the invention the refractive indices of the storage particles on the one hand and of the binding agent on the other are adjusted to one another. The optical inner boundary surfaces at which the scattering of activating light and measuring light takes place therefore disappear. The whole of the storage layer behaves optically like a single-component material.

An improved resolution is thus obtained with the storage element according to the invention.

If different salts crystallising together are used for the storage particles, the refractive index may be adjusted simply within very wide limits. It is possible by corresponding variation of the ratio in which the two salts are provided to cover a wide range of binding agent refractive indices, to attain exactly the refractive index of a predetermined binding agent.

A refractive index of preferably between 1.4 and 1.6 is selected for the binding agent according to a preferred embodiment of the invention. A large number of different salt compositions is then available with which said range of the refractive index may be realised, so that a selection may be made from said large number in terms of other parameters to be included, e.g. the size of the particular unit cell of the salt which influences the preferred excitation wavelength of the colour centres formed.

If an isotropic binding agent and isotropic storage particles are used, this also prevents small residual scattering of the light, such as would be caused by an anisotropic material.

An anit-reflection coating borne by the front side of the storage layer prevents a deterioration in the resolution, such as would be obtained by reflections on the front boundary surface of the storage layer viewed in the direction of motion of the light.

With an absorbing layer arranged on the rear side of the storage layer, reflections of activating light on the rear side of the storage layer are eliminated. A further improved spatial resolution of the X-ray image read out is thereby obtained.

With a storage element the rear side of which is provided with a reflecting layer the yield of fluorescent light is improved, since the light radiated into the rear half-space is reflected towards the front side. The sensitivity of the storage film is improved by a factor of 2 in this way.

A storage element in which a protective layer of material absorbing X-ray beams is arranged behind the storage layer is of advantage in terms of minimising the radiation load on a patient whose teeth are X-rayed with a storage element held behind the jaw.

If such protective layer is firmly connected to the storage layer, this is of advantage in terms of a simple handling of the storage element. The whole of the storage element may thus also be bent without fold formation.

A storage element forming a bendable layered structure may be adapted effectively to curved surfaces, e.g. the curvature of a jaw.

If a storage element is produced by preparing a binding agent in the liquid state, dispersing storage particles in the liquid binding, dispersing the material obtained in this way to form a thin film-type layer and then curing the binding agent, this method ensures that the binding agent also fits exactly positively in microscopic terms around the storage particles. No small air inclusions or cavities therefore arise, which in turn could again represent scatter centres.

Figure 2:
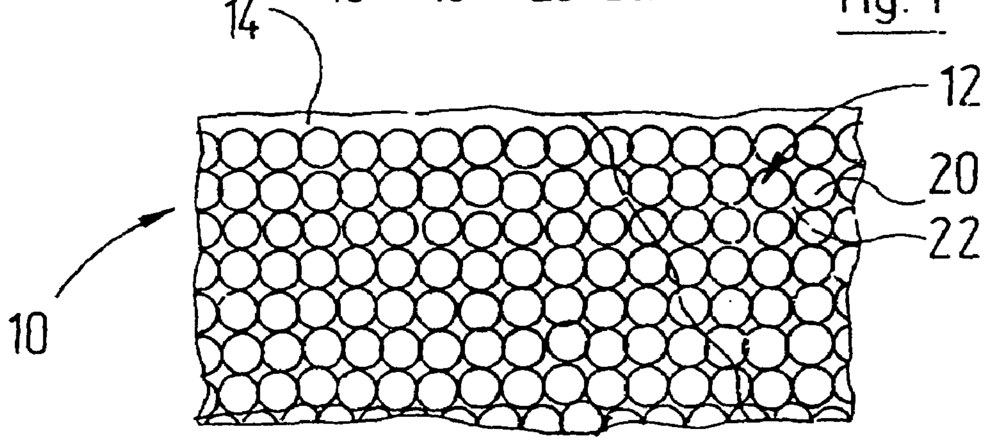
Figure 3:
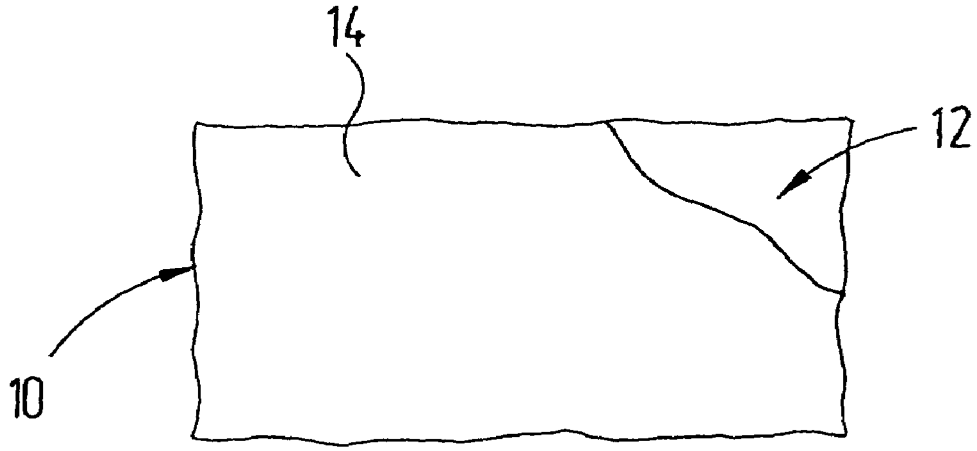

The invention will be explained in detail below from embodiments with reference to the drawing. In the latter:

FIG. 1 shows an enlarged section through a bendable storage element for use in the X-raying of teeth, which is placed perpendicular to the plane of the storage element, FIG. 2 shows a view onto the storage element, such as is obtained if the refractive indices of storage particles and binding agents of the storage element are different, FIG. 3 shows a similar view to FIG. 2, such as is obtained if the refractive indices of storage particles and binding agents are equal and FIG. 4 shows a graphic representation of the refractive indices of selected transparent plastics materials.

FIG. 1 shows a section through a flexible storage element 10 which may be used instead of a conventional tooth film during the x-raying of teeth. The storage element has a central storage layer 12 whose composition will be described in even greater detail below, a front anti-reflection coating 14, a rear reflecting/absorbing layer 16 and a lead film 18 also lying behind the latter. The reflecting/absorbing layer 16 reflects fluorescent light such as is given out of the storage element during the point-by-point reading out using a laser beam, and absorbs the laser excitation light which is used for the point-by-point reading out of the storage element. Consequently the fluorescent light generated in the interior of the storage element 10 is emitted completely towards the front side of the storage element 10.

The reflective layer may be formed by a corresponding interference layer. It may also for its part be produced from two sub-layers lying one behind the other, e.g. a front sub-layer, which is responsible for the reflection of the fluorescent light, and a second, rear sub-layer, which absorbs the laser excitation light.

A metal such as aluminium may be used for the reflecting sub-layer. Said layer may then simply be vapour-deposited onto the rear side of the storage layer 12. Instead of this it is also possible to use a diffusely reflecting powder layer as reflecting sub-layer, which consists e.g. of $BaSO_4$ powder. $BaSO_4$ is characterised by a particularly high reflection factor for light of the wavelengths of interest here.

The various layers are connected to form a one-piece layered structure, wherein the connection between the storage layer 12 and the anti-reflection coating 14 or the absorbing layer 16 is obtained by in-situ application of the two last-mentioned layers, e.g. by evaporation or by printing on of a corresponding ink and vaporising of the solvent etc. The lead film 18 may be connected to the rear side of the absorbing layer 16 by a thin layer of adhesive.

The storage layer 12 comprises a large number of storage particles 20 which are shown simplified in the drawing as small spheres, but in reality have an irregular geometry such as is obtained by the fine grinding of salt. The storage particles 20 are held together by a transparent binding agent 22 which is preferably a transparent organic binding agent that is selected from the group given in Table 1 below:

TABLE 1

| Class | Representative | Abbreviation |
|---|---|---|
| Polyolefins | Polyethylene | PE |
| | Polypropylene | PP |
| | special polyolefins | PB, PMP |
| Vinyl chloride polymers | Polyvinyl chloride, rigid | PVC-U |
| | Polyvinyl chloride, flexible | PVC-P |
| Styrene polymers | Polystyrene | PS |
| | Styrene-butadiene | SB |
| | Styrene-acrylonitrile | SAN |
| | Acrylonitrile-butadiene-styrene | ABS |
| | SAN with acrylic elastomer | ASA |
| Cellulose esters | Cellulose ester | CA, CP, CAB |
| Polymethyl methacrylate | Polymethyl methacrylate | PMMA |
| Polyamides | Polyamide 6 | PA6 |
| | Polyamide 66 | PA66 |
| | Polyamide 11, polyamide 12 | PA11, PA12 |
| | Polyamide amorphous | PA6-3-T |
| Polyacetals | Polyoxymethylene | POM |
| Linear polyesters | Polyethylene terephthalate | PETP |
| | Polybutylene terephthalate | PBTP |
| Polycarbonate | Polycarbonate | PC |
| Polyphenylene oxide | Polyphenylene oxide modified | PPO |
| Special plastics | Polysulphones | PSU, PES |
| | Polyphenylene sulphide | PPS |
| | Polyimides | PI |
| | Silicone resin materials | SI |
| Fluorine-containing | Polytetrafluoroethylene | PTEE |
| polymers | Fluorine-containing thermoplastics | FEP, PFA ETFE, PVDF, PVF |
| Phenoplastics | Phenoplastics | PF |
| Aminoplastics | Melamine resins | MF |
| | Urea resins | UF |
| Unsaturated polyesters | Unsaturated polyesters | UP |
| Epoxy resins | Epoxy resins | EP |

The refractive index for the above-mentioned plastics for visible light is shown in FIG. 4 of the drawing.

In FIG. 4 the binding agents which are crystal clear are provided additionally with a star.

The storage particles 20 consist of a material in which metastable excited states are generated by interaction with impinging X-ray beams. Said metastable states have typically a life of at least a few minutes. Because activating light is irradiated into the absorption bands of said metastable states, an unstable excited state may be obtained, which then passes into the ground state with the emission of fluorescent light.

Suitable metastable states are based in practice on defects in the crystal lattice, which are formed inter alia by lattice defects or else impurity atoms. Thus in alkali halide crystals, for example, anion defects may store electrons metastably, which are accelerated during the X-ray absorption, and form so-called colour centres. Holes may form metastable states in said metals in V-centres or on impurity atoms.

The capacity to generate a latent X-ray image in the storage layer 12 is attributable to the colour centres of the storage particles 20. The refractive index which the activating light sees or the fluorescent light triggered by the latter sees, depends first and foremost on the macroscopic refracting angle index of the storage particles 20 or of the binding agent 22.

Because the two refractive indexes are adjusted to one another, the scattering of the activating light and of the fluorescent light, which is generated by emptying of a metastable state with the use of activating light, is prevented. The fluorescent light detected with a photodetector, which forms part of a reproduction device for latent X-ray beams, may therefore be correlated precisely with the radiated point-by-point read-out surface of the storage element.

The adjustment of the refractive indices of storage particles 20 and binding agent 22 may in the case of alkali halides be produced within wide limits by specific choice of the basic material for storage particles 20. Table 2 below gives an overview of the refractive indices of pure alkali halides:

TABLE 2

| | F | Cl | Br | I |
|---|---|---|---|---|
| Li | 1.3915 | 1.662 | 1.784 | 1.955(3) |
| Na | 1.327 | 1.5442 | 1.6412 | 1.7745 |
| K | 1.363 | 1.490 | 1.559 | 1.677 |
| Rb | 1.398 | 1.493 | 1.5530 | 1.6474 |
| Cs | 1.478(5) | 1.6418 | 1.6984 | 1.7676 |

Since the alkali halides are all miscible with one another over a wide range (same crystal class), the refractive index of the mixed crystal obtained may be varied within wide limits by the mixing of two different salts. If, for example, a mixed crystal of KCl and RbBr is considered and the composition of the mixed crystal is written as $K_xRb_{1-x}Cl_yBr_{1-y}$, where x and y each lie in the range between 0 and 1, there is obtained with varying of x and y between 0 and 1 a range of adjustment of the refractive index of 1.490 to 1.559.

If defects are formed in said mixed crystal, e.g. by the addition of 0.1 mol % $Tl^+$, because of the small concentration, the doping has only a small effect on the refractive index of the mixed crystal of not more than 0.1%.

A second means of securing the adjustment of the refractive index is the selection of the binding agent, wherein different refractive indices are obtained for different binding agents in accordance with the nature of the monomers. For some of the binding agents the refractive index may again be varied within a range by influencing the chain length and the cross-linking. This is discernible from the representation of the refractive index for various plastics materials which is reproduced in FIG. 4.

Typically the diameter of the storage particles comes to about 10 $\mu$m, the thickness of the storage layer to 100 $\mu$m.

It is further seen from FIG. 4 that glasses are also considered as binding agents, wherein the refractive index may be adjusted over a greater range by means of the composition of the glasses.

In terms of the robustness of the storage element and in terms of a manufacturability of the storage elements at not excessively high temperatures, organic binding agents are preferred.

The anti-reflection coating is produced in the conventional manner, e.g. by the evaporation of material with suitable refractive index and in suitable thickness. The absorbing layer 16 is manufactured of a material absorbing the laser light used for the reading out of the latent image and may likewise be vapour-deposited or printed on as ink.

In FIG. 2 the various storage particles 20 appear as phase objects. There is therefore obtained there microscopically the same image as that of glass beads placed in a glass of water.

Because the refractive index of storage particles 20 and binding agent 22 are adjusted to one another, said phase objects disappear and there is obtained for the storage element the appearance reproduced in FIG. 3: the latter behaves for the laser light used for the reading out of the latent X-ray image like homogeneous slab glass.

As already mentioned above, the storage particles have in reality the shape of ground material with small bevels. In order also to obtain an embedding of the storage particles in the binding agent which is free of microscopic cavities, the following procedure is adopted during the production of the storage layer 12:

Binding agent 22 is prepared in the liquid state. The storage particles 20 are distributed homogeneously in the liquid binding agent 22. The material obtained in this way is brushed out to a thin layer and the binding agent is then cured, so that a storage film with corresponding thickness is obtained.

The binding agent is further preferably prepared in the highly liquid state, to which end it is diluted and/or heated.

I claim:

1. Flat storage element for an X-ray image, with a large number of storage particles which may be placed by means of X-ray light in metastable excitation states that are convertible by irradiation with activating light into an unstable excitation state which is in turn decomposed with the radiation of fluorescent light, and with a transparent binding agent by means of which the storage particles are held together to form a storage layer, wherein the binding agent and the storage particles have substantially the same refractive index and the binding agent is crystal clear, wherein the storage particles consist of a transparent salt material which comprises two salts chemically different but crystallizing in the same crystal structure, wherein the salts form a mixed crystal, the storage element further comprising that the refractive indices of the storage particles and the binding agent are isotropic.

2. Storage element according to claim 1, wherein the salts differ in at least one of their cations and anions.

3. Storage element according to claim 2, wherein the cations are halide ions.

4. Storage element according to claim 1, wherein the binding agent is a transparent plastics material with a refractive index of between 1.4 and about 1.6.

5. Storage element according to claim 1, further comprising an anti-reflection coating borne by the front surface of the storage layer.

6. Storage element according to claim 1, wherein the rear side of the storage layer bears an absorbing layer which absorbs the activating light.

7. Storage element according to claim 1, wherein a reflecting layer is provided on the rear side of the storage layer, which reflects the fluorescent light and is connected firmly to the storage layer.

8. Storage element according to claim 1, wherein a protective layer of material absorbing X-ray beams is arranged behind the storage layer, the protective layer comprising a metal layer consisting of a metal with high order number such as lead.

9. Storage element according to claim 8, wherein the protective layer is connected firmly to the storage layer by an adhesive layer that absorbs the activating light.

10. Storage element according to claim 1, wherein at least one of the storage layer, the anti-reflection coating, the absorbing layer, the reflecting layer, and the protective layer form a bendable layered structure.

11. The storage element according to claim 1, wherein the crystal clear binding agent is chosen from the group consisting of EIFE, MF resin, EP resin, crowns, flints, rigid PVC, PS, SAN, PA6, PA66, PA11, Pa12, and PC.

12. The storage element according to claim 1, wherein the two salts comprise one salt from Group I of the Periodic Table, and another salt from Group VII of the Periodic Table.

13. Method for producing a storage element according to claim 1, wherein the binding agent is prepared in the highly liquid state through heating, and the storage particles are dispersed in the liquid binding agent, wherein the material obtained in this way is dispersed to form a thin film-type layer and the binding agent is then cured.

14. A method for producing a storage element for an X-ray image with a large number of transparent storage particles which may be placed by means of X-ray light in metastable excitation states that are convertible by irradiation with activating light into an unstable excitation state which is in turn decomposed with the radiation of fluorescent light, and with a transparent binding agent by means of which the storage particles are held together to form a storage layer, wherein the binding agent and the storage particles both have substantially the same refractive index, are both crystal clear and are both optically isotropic, and wherein the refractive index of the binding agent is measured and wherein two salts, which are chemically different but crystallize in the same crystal structure are selected, one of which having a refractive index lower than the refractive index of the binding agent and the other having a refractive index above the refractive index of the binding agent and the two salts are mixed in a proportion such that the refractive index of the mixed crystals obtained form the two salts matches the refractive index of the binding agent.

15. The method according to claim 14, wherein the binding agent is taken from the group consisting of EIFE, MF resin, EP resin, crowns, flints, rigid PVC, PS, SAN, PMMA, PA6, PA66, PA11, PA12, and PC.

16. The method as in claim 14, wherein the salts differ in their cations.

17. The method as in claim 14, wherein the salts differ in their anions.

18. The method as in claim 14, wherein the salts differ in their cations and anions.

19. Flat storage element for an X-ray image, with a large number of storage particles which may be placed by means of X-ray light in metastable excitation states that are convertible by irradiation with activating light into an unstable excitation state which is in turn decomposed with the radiation of fluorescent light, and with a transparent binding agent by means of which the storage particles are held together to form a storage layer, wherein the binding agent and the storage particles have substantially the same refractive index, are crystal clear, and are optically isotropic, wherein the storage particles consist of a transparent salt material which comprises two salts chemically different but crystallizing in the same crystal structure, wherein the salts form a mixed crystal.

20. Storage element according to claim 19, wherein the salts differ in at least one of their cations and anions.

21. Storage element according to claim 20, wherein the cations are halide ions.

22. Storage element according to claim 19, wherein the binding agent is a transparent plastics material with a refractive index of between 1.4 and about 1.6.

23. Storage element according to claim 19, further comprising an anti-reflection coating borne by the front surface of the storage layer.

24. Storage element according to claim 19, wherein the rear side of the storage layer bears an absorbing layer which absorbs the activating light.

25. Storage element according to claim 19, wherein a reflecting layer is provided on the rear side of the storage layer, which reflects the fluorescent light and is connected firmly to the storage layer.

26. Storage element according to claim 19, wherein a protective layer of material absorbing X-ray beams is arranged behind the storage layer, the protective layer comprising a metal layer consisting of a metal with high order number such as lead.

27. Storage element according to claim 26, wherein the protective layer is connected firmly to the storage layer by an adhesive layer that absorbs the activating light.

28. Storage element according to claim 19, wherein at least one of the storage layer, the anti-reflection coating, the absorbing layer, the reflecting layer, and the protective layer form a bendable layered structure.

29. Method for producing a storage element according to claim 19, wherein the binding agent is prepared in the liquid state and the storage particles are dispersed in the liquid binding agent, and that the material obtained in this way is dispersed to form a thin film-type layer and the binding agent is then cured.

30. Method according to claim 29, wherein the binding agent is prepared in the highly liquid state, to which end it is at least one of diluted and heated.

31. The storage element according to claim 19, wherein the crystal clear binding agent is chosen from the group consisting of EIFE, MF resin, EP resin, crowns, flints, rigid PVC, PS, SAN, PMMA, PA6, PA66, PA11, PA12, and PC.

32. A flat storage element for an x-ray image, the element comprising:

a plurality of storage particles capable of excitation to a metastable excitation state by exposure to x-ray light, and then into a further unstable excitation state by irradiation with activating light, and being capable of decomposing from the unstable excitation state by radiating fluorescent light, the storage particles consisting of a transparent salt material comprising two chemically different salts that crystallize in the same crystal structure to form a mixed crystal, a transparent and crystal clear binding agent within which the storage particles are held, the binding agent and the storage particles together forming a storage layer, wherein the binding agent and the storage particles have substantially the same refractive index, and are both isotropic.

33. A method for producing a storage element for an x-ray image, the method comprising the steps of:

selecting a binding agent having a refractive index, selecting a first salt and a second salt, which are chemically different but crystallize in the same crystal structure, the first salt having a refractive index lower than the refractive index of the binding agent, and the second salt having a refractive index higher than the refractive index of the binding agent, mixing the first and second salt together to form a mixed crystal having a refractive index, wherein the first and second salt are mixed together in a proportion such that the refractive index of the mixed crystal matches the refractive index of the binding agent, wherein the binding agent and the storage particles have substantially the same refractive index, and are both isotropic.

34. A method for producing a storage element for an x-ray image, the method comprising the steps of:

preparing a binding agent in a highly liquid state by heating the binding agent, the binding agent comprising a transparent and crystal clear material, dispersing storage particles in the liquid binding agent, the storage particles being capable excitation to a metastable excitation state by exposure to x-ray light, and then into a further unstable excitation state by irradiation with activating light, and being capable of decomposing from the unstable excitation state by radiating fluorescent light, the storage particles consisting of a transparent salt material comprising two chemically different salts that crystallize in the same crystal structure to form a mixed crystal, wherein the binding agent and the storage particles have refractive indices that are substantially the same, and are isotropic, the method further comprising the steps of:

dispersing the liquid binding agent and dispersed storage particles into a thin film-type layer, and curing the binding agent to form the storage element.

35. Flat storage element for an X-ray image, with a large number of storage particles which may be placed by means of X-ray light in metastable excitation states that are convertible by irradiation with activating light into an unstable excitation state which is in turn decomposed with the radiation of fluorescent light, and with a transparent binding agent by means of which the storage particles are held together to form a storage layer, wherein the binding agent and the storage particles have substantially the same refractive index, are crystal clear, and are optically isotropic, wherein the storage particles consist of a transparent salt material which comprises two salts chemically different but crystallizing in the same crystal structure, wherein the salts form a mixed crystal, and wherein the crystal clear binding agent is chosen from the group consisting of EIFE, MF resin, EP resin, crowns, flints, rigid PVC, PS, SAN, PMMA, PA6, PA66, PA11, PA12, and PC.

36. Storage element according to claim 35, wherein the salts differ in at least one of their cations and anions.

37. Storage element according to claim 36, wherein the cations are halide ions.

38. Storage element according to claim 35, wherein the binding agent is a transparent plastics material with a refractive index of between 1.4 and about 1.6.

39. Storage element according to claim 35, further comprising an anti-reflection coating borne by the front surface of the storage layer.

40. Storage element according to claim 35, wherein the rear side of the storage layer bears an absorbing layer which absorbs the activating light.

41. Storage element according to claim 35, wherein a reflecting layer is provided on the rear side of the storage layer, which reflects the fluorescent light and is connected firmly to the storage layer.

42. Storage element according to claim 35, wherein a protective layer of material absorbing X-ray beams is arranged behind the storage layer, the protective layer comprising a metal layer consisting of a metal with high order number such as lead.

43. Storage element according to claim 42, wherein the protective layer is connected firmly to the storage layer by an adhesive layer that absorbs the activating light.

44. Storage element according to claim 35, wherein at least one of the storage layer, the anti-reflection coating, the absorbing layer, the reflecting layer, and the protective layer form a bendable layered structure.

45. Flat storage element for an X-ray image, with a large number of storage particles which may be placed by means of X-light in metastable excitation states that are convertible by irradiation with activating light into an unstable excitation state which is in turn decomposed with the radiation of fluorescent light, and with a transparent binding agent by means of which the storage particles are held together to form a storage layer, wherein the binding agent and the storage particles have substantially the same refractive index, are crystal clear, and are optically isotropic, wherein the storage particles consist of a transparent salt material which comprises two salts chemically different but crystallizing in the same crystal structure, wherein the salts form a mixed crystal, wherein the crystal clear binding agent is chosen from the group consisting of EIFE, MF resin, EP resin, crowns, flints, rigid PVC, PS, SAN, PMMA, PA6, PA66, PA11, PA12, and PC and wherein the salts chemically different material are formed by different alkali halides.

46. Storage element according to claim 45, wherein the salts differ in at least one of their cations and anions.

47. Storage element according to claim 46, wherein the cations are halide ions.

48. Storage element according to claim 45, wherein the binding agent is a transparent plastics material with a refractive index of between 1.4 and about 1.6.

49. Storage element according to claim 45, further comprising an anti-reflection coating borne by the front surface of the storage layer.

50. Storage element according to claim 45, wherein the rear side of the storage layer bears an absorbing layer which absorbs the activating light.

51. Storage element according to claim 45, wherein a reflecting layer is provided on the rear side of the storage layer, which reflects the fluorescent light and is connected firmly to the storage layer.

52. Storage element according to claim 45, wherein a protective layer of material absorbing X-ray beams is arranged behind the storage layer, the protective layer comprising a metal layer consisting of a metal with high order number such as lead.

53. Storage element according to claim 52, wherein the protective layer is connected firmly to the storage layer by an adhesive layer that absorbs the activating light.

54. Storage element according to claim 45, wherein at least one of the storage layer, the anti-reflection coating, the absorbing layer, the reflecting layer, and the protective layer form a bendable layered structure.

* * * * *

UNITED STATES PATENT AND TRADEMARK OFFICE

CERTIFICATE OF CORRECTION

PATENT NO. : 6,974,959 B1

DATED : December 13, 2005

INVENTOR(S) : Thoms

It is certified that error appears in the above-identified patent and that said Letters Patent is hereby corrected as shown below:

Title page,

Item [30], Foreign Application Priority Data, should read -- 198 59 880.7 --.

Signed and Sealed this

Seventh Day of February, 2006

JON W. DUDAS

*Director of the United States Patent and Trademark Office*